PREPARATION OF DIACETONITRILE

Herbert Karl Kunisch, Brig, and Christoph Anton Zinsstag, Visp, Switzerland, assignors to Lonza Ltd., Basel, Switzerland
No Drawing. Filed Dec. 30, 1963, Ser. No. 334,553
Claims priority, application Switzerland, Jan. 3, 1963, 8/63
3 Claims. (Cl. 260—465.5)

This invention relates to the preparation of diacetonitrile, which term designates a mixture of the tautomeric compounds beta-aminocrotonitrile and beta-iminobutyronitrile.

The synthesis of diacetonitrile from acetonitrile proceeds in two steps according to the reactions (1) 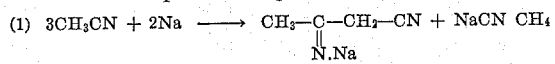

(2) 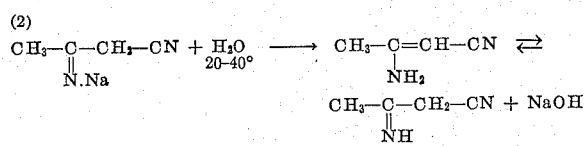

In the first step, condensation of the acetonitrile forms sodium-beta-iminobutyronitrile, which in the second step is hydrolized by means of water to the diacetonitrile.

A known preparation method consists in reacting under reflux conditions carefully dried acetonitrile and metallic sodium in absolute ether or petroleum ether (boiling range 30–60° C.) as diluent to form sodium-beta-iminobutyronitrile, separating the crystallized sodium compound together with the formed sodium cyanide and unreacted sodium from the diluent by filtration, washing, and treating the solid sodium compound with water and ether, whereby diacetonitrile is formed by hydrolysis; the diacetonitrile is removed in ethereal solution and recovered by evaporation of the ether.

In another procedure, diacetonitrile has been prepared from acetonitrile without use of a diluent by employing an excess of sodium. In order to prevent interference by the contact with air, a layer of ligroin is placed on the acetonitrile in the still of the reflux cooler. The addition of the sodium is made through the reflux cooler. After filtration, the solid product is hydrolized with water, extracted with benzene, and the diacetonitrile is recovered from the extract.

Said known procedures are unsatisfactory for the commercial synthesis of diacetonitrile. Not only are the yields not higher than 70 to 80 percent, but the reflux operation requires large installations in order to prevent losses of the low boiling diluent part of which is entrained with the developed methane. In addition, the intermediate sodium compound must be separated prior to the hydrolysis, filtered and washed, which complicates large scale operation. A further drawback is presented by the possibility that the recovered solid product still contains unreacted sodium. This must be either removed prior to the hydrolysis, or utmost care has to be taken when carrying out the hydrolysis to avoid explosions.

It is, therefore, a principal object of the invention to provide a preparation method for diacetonitrile which is simple and give high yields in excess of 90 percent.

Other objects and advantages will be apparent from a consideration of the specification and claims.

According to the invention, the condensation of the acetonitrile with sodium is carried out in a reaction medium comprising an aliphatic hydrocarbon in the boiling range of 70 to 180° C., preferably 100–140° C., at a temperature in the range of 10 to 35° C.; subsequently, the hydrolysis is carried out by direct addition of water to the reaction medium in such an amount that three layers are formed: An upper hydrocarbon layer, a middle layer of diacetonitrile and unreacted acetonitrile, and a lower layer consisting of an aqueous sodium cyanide and sodium hydroxide solution. The diacetonitrile can then be recovered in pure state from the middle layer, e.g. by decantation and fractionation.

The amount of water added for the hydrolysis preferably is such as to produce a salting out effect of the dissolved sodium cyanide and sodium hydroxide which is sufficiently to displace substantially completely the diacetonitrile and unrecated acetonitrile from the aqueous solution.

A preferred embodiment of the invention consists in employing the sodium in form of its dispersion in an aliphatic hydrocarbon having a boiling range of 70 to 180° C., preferably 100–140° C. This provides for easy manipulation of the sodium and a shorter reaction time.

A further advantage of the novel method is the possibility to reuse the separated upper hydrocarbon layer directly for a new batch.

The following examples will serve to illustrate the practice of the invention in more detail.

Example 1

28 kg. of sodium are heated in a melting vessel at 105 to 110° C. (M. 98° C.). The molten sodium is homogenized by stirring for a period of about 5 to 10 minutes.

A reaction vessel equipped with stirrer and cooling means is filled with 81.9 kg. of acetonitrile (theoretically required amount=74.7 kg.; excess=8.7%), and a layer of 160 liter of benzine (B.=100–140°) is placed on top of said acetonitrile layer. The vessel is cooled at 20° C.

The molten sodium is drained from said melting vessel through a bottom valve and a line kept at a temperature of about 120° C. into the cooled reaction vessel whose contents are continuously stirred. The feed of the sodium melt is so adjusted that the temperature in the reaction vessel does not exceed 35° C. The time required to add the sodium under these conditions is about 2 to 2½ hours.

The methane developed by the reaction escapes through the brine cooler. As soon as the gas development ceases and the temperature in the reaction vessel drops, the water required for the hydrolysis of the sodium salt of the diacetonitrile (80 liter) is added with stirring and cooling at such a rate that the temperature of the reaction vessel does not exceed 40° C. This requires a time of about 2 hours for the gradual addition of the water. The contents of the reaction vessel then consist of 3 layers which are easily separated by decantation at temperatures of 50 to 60° C.

The middle layer containing the diacetonitrile is processed to technically pure diacetonitrile by fractionation. There are obtained 45 kg. of a product containing 95 to 96%. 3 kg. of acetonitrile are recovered. The loss of benzine is hardly detectable and amounts to less then 1 kg. per batch.

Example 2

14 kg. of sodium and 14 kg. of benzine (B.=100–140° C.), and 1% by weight of oleic acid (dispersing agent), calculated on the amount of sodium, are heated up in a dispersion mixer to a temperature of 105 to 110° C. The agitator of the mixer is operated for about 20 minutes whereupon it is stopped and the dispersion is allowed to cool. Then the dispersion is continuously fed into a reaction vessel containing 41 kg. of acetonitrile and on top thereof a layer of 50 kg. of benzine (B.=100–140° C.). The further procedure is as described in Example 1. The yield of diacetonitrile is in excess of 90%.

The upper benzine layer may be used directly for preparing a fresh sodium dispersion.

During the reaction, the melting or dispersing vessel as well as the reaction vessel are kept under dry nitrogen.

We claim:

1. In the preparation of diacetonitrile by condensation of acetonitrile with metallic sodium at a temperature of 10 to 35° C. and subsequent hydrolysis of the obtained sodium salt with water, the improvement which consists in carrying out said condensation in benzine boiling in the range of 70 to 180° C. as reaction medium, and adding the water, after completed condensation, directly to the condensation product contained in said benzine, in an amount producing stratification of the system into three layers, an upper layer consisting essentially of said benzine, a middle layer containing diacetonitrile and unreacted acetonitrile, and a lower layer being an aqueous solution of sodium cyanide and sodium hydroxide, separating said middle layer by decantation, and fractionating said decanted middle layer to recover diacetonitrile.

2. The process as claimed in claim 1 comprising re-using said upper layer as reaction medium.

3. The process as claimed in claim 1 wherein the reaction is carried out under an inert protective gas.

References Cited by the Examiner

Adkins et al., J.A.C.S., 64, 1942, pp. 150–154.
Reynolds et al., C.A., 45, 1941, p. 8519.

CHARLES B. PARKER, *Primary Examiner.*

JOSEPH P. BRUST, *Assistant Examiner.*